United States Patent
Bian et al.

(10) Patent No.: US 10,002,632 B2
(45) Date of Patent: Jun. 19, 2018

(54) RECORDING MEDIUM WITH THIN STABILIZATION LAYER HAVING HIGH MAGNETIC SATURATION AND ANISOTROPIC FIELD CHARACTERISTICS

(71) Applicant: Seagate Technology LLC, Cupertino, CA (US)

(72) Inventors: Bo Bian, Fremont, CA (US); Weikang Shen, Milpitas, CA (US); Pengcheng Li, Fremont, CA (US); Miaogen Lu, Fremont, CA (US); Connie Chunling Liu, San Jose, CA (US); Thomas Nolan, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 387 days.

(21) Appl. No.: 13/722,632

(22) Filed: Dec. 20, 2012

(65) Prior Publication Data
US 2013/0163118 A1    Jun. 27, 2013

Related U.S. Application Data

(60) Provisional application No. 61/579,529, filed on Dec. 22, 2011.

(51) Int. Cl.
*G11B 5/66* (2006.01)
*G11B 5/82* (2006.01)

(52) U.S. Cl.
CPC . *G11B 5/82* (2013.01); *G11B 5/66* (2013.01)

(58) Field of Classification Search
CPC .................................... G11B 5/66; G11B 5/82
See application file for complete search history.

(56) References Cited

U.S. PATENT DOCUMENTS

| | | | |
|---|---|---|---|
| 6,468,670 B1 * | 10/2002 | Ikeda et al. | 428/611 |
| 7,192,664 B1 | 3/2007 | Wu et al. | |
| 7,867,637 B2 | 1/2011 | Girt et al. | |
| 8,119,263 B2 | 2/2012 | Nolan et al. | |
| 2004/0209037 A1 * | 10/2004 | Nishikawa et al. | 428/65.3 |
| 2007/0111035 A1 | 5/2007 | Shimizu et al. | |
| 2009/0011281 A1 | 1/2009 | Oikawa et al. | |

(Continued)

FOREIGN PATENT DOCUMENTS

| | | |
|---|---|---|
| JP | 2009015959 A | 1/2009 |
| JP | 2009110641 A | 5/2009 |

(Continued)

OTHER PUBLICATIONS

PCT Search Report, dated Apr. 22, 2013.

(Continued)

*Primary Examiner* — Holly Rickman
*Assistant Examiner* — Linda Chau
(74) *Attorney, Agent, or Firm* — Hall Estill Attorneys at Law

(57) ABSTRACT

A perpendicular recording medium with enhanced magnetic stability. In accordance with some embodiments, a multi-layer recording structure is formed on a base substrate and adapted to magnetically store a magnetic bit sequence in domains substantially perpendicular to said layers. A thin magnetic stabilization layer is formed on the multi-layer recording substrate to magnetically stabilize an upper portion of the recording structure.

16 Claims, 4 Drawing Sheets

(56) References Cited

U.S. PATENT DOCUMENTS

| | | |
|---|---|---|
| 2009/0080110 A1 | 3/2009 | Berger et al. |
| 2009/0191331 A1 | 7/2009 | Umezawa et al. |
| 2009/0197119 A1* | 8/2009 | Kong et al. .................. 428/800 |
| 2009/0226762 A1* | 9/2009 | Hellwig et al. ............... 428/815 |
| 2010/0190035 A1 | 7/2010 | Sonobe et al. |
| 2010/0255348 A1 | 10/2010 | Sato et al. |
| 2010/0323220 A1 | 12/2010 | Onoue |

FOREIGN PATENT DOCUMENTS

| | | |
|---|---|---|
| JP | 2009187652 A | 8/2009 |
| JP | 2009-230837 | 10/2009 |
| JP | 2010225212 A | 10/2010 |

OTHER PUBLICATIONS

Dieter Weller, Andreas Moser, Liesl Folks, Margaret E. Best, Wen Lee, Mike F. Toney, M. Schwickert, Jan-Ulrich Thiele and Mary F. Doerner, "High Ku Materials Approach to 100 Gbits/in2," IEEE Transactions on Magnetics, Jan. 2000, vol. 36, No. 1, pp. 10-15.

\* cited by examiner

RECORDING MEDIUM WITH THIN STABILIZATION LAYER HAVING HIGH MAGNETIC SATURATION AND ANISOTROPIC FIELD CHARACTERISTICS

RELATED APPLICATION

The present application makes a claim of domestic priority under 35 U.S.C. § 119(e) to U.S. Provisional Patent Application No. 61/579,529 filed Dec. 22, 2011, the contents of which are hereby incorporated by reference.

SUMMARY

Various embodiments of the present disclosure are generally directed to a perpendicular recording medium with enhanced magnetic stability. In accordance with some embodiments, a multi-layer recording structure is formed on a base substrate and adapted to magnetically store a magnetic bit sequence in domains substantially perpendicular to said layers. A thin magnetic stabilization layer is formed on the multi-layer recording substrate to magnetically stabilize an upper portion of the recording structure.

These and other features and advantages of various embodiments can be understood with a review of the following detailed description section and the accompanying drawings.

DETAILED DESCRIPTION

In a perpendicular recording system, a magnetic sequence is written to a recording structure of a medium with magnetic domains that extend in a direction generally perpendicular to a direction of movement of the medium (e.g., in a "vertical" direction perpendicular to one or more "horizontal" recording layers).

High density perpendicular recording media can require careful control and balance of several magnetic properties, such as lateral exchange coupling low enough to maintain small cluster size; grain-to-grain uniformity of anisotropic magnetic field strength (Hk) and exchange to have narrow switching field distribution (SFD); sufficiently high magnetic anisotropy to enable thermal stability and ensure compatibility with a high gradient recording head; low enough switching field strength to enable writability by a write head.

Some perpendicular recoding recording media employ an oxide based granular bottom magnetic layer with high Hk and low exchange, and continuous magnetic layers above to tune exchange coupling, reduce SFD and improve writability. In order to keep low noise and uniform exchange, a relatively high content of segregates such as boron (B) may be applied in the top magnetic layer. While generally operable, a higher content of segregates can introduce defects such as stacking faults, which in turn can decrease Hk and Ms, and can degrade Hk uniformity and SFD.

As recording density continues to increase, it is desirable to provide smaller grain structures to maintain the number of magnetic particles in a bit at a similar value. Smaller grain structures tend to be more sensitive to non-uniformities such as anisotropy variations within grains, and also require higher anisotropy to maintain thermal stability, thus making writability worse. Thus, there is a need in the art for a media with improved bit error rate (BER), writability and thermal stability.

Accordingly, various embodiments disclosed herein are generally directed to a data recording medium having a continuous top magnetic layer with high magnetic saturation (Ms) and anisotropic field (Hk) characteristics to stabilize an adjacent recording layer. The top magnetic layer may be a relatively thin layer of hard magnetic material. The layer is operative to enhance BER and thermal stability performance of the medium.

Some types of recording media formatted in accordance with the present disclosure are particularly suitable for use in a heat assisted magnetic recording (HAMR) recording system, although such is merely exemplary and not limiting. In other applications, the recording media as embodied herein can be suitable for non-HAMR recording systems, such as ECC+CGC perpendicular recording media. Single disc designs or multi-disc designs can be used.

Figure 1:
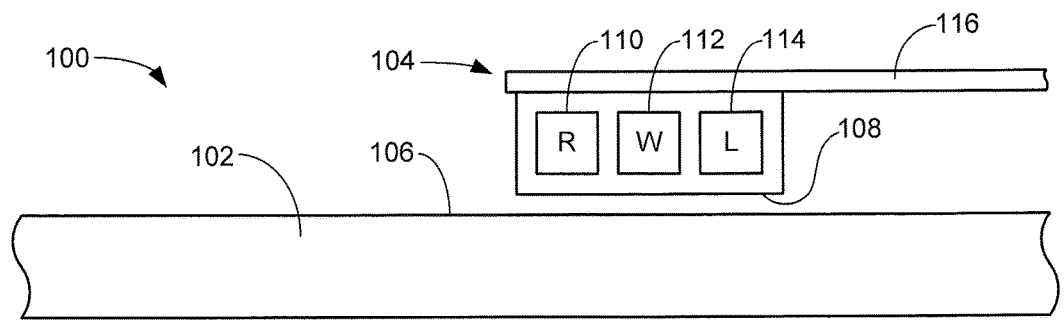
FIG. 1 is a schematic depiction of a data storage system in accordance with some embodiments.

These and other features of various embodiments can be understood beginning with a review of FIG. 1, which represents aspects of an exemplary data storage system 100. The system 100 includes a rotatable data recording medium 102 and an adjacent data transducer 104. The data transducer 104 is characterized as employing heat assisted magnetic recording (HAMR), although such is merely exemplary and not limiting.

Generally, the medium 102 and the transducer 104 may be incorporated into a hard disc drive (HDD) or other data storage device in which multiple axially arranged recording media (discs) and HAMR data transducers are used to read and write user data from a host device.

In some embodiments, the data are stored on the medium 102 along a number of concentric tracks (not shown) defined along a surface 106 of the medium. The data may be stored in the form of addressable user data sectors of fixed size along the tracks. Hydrodynamic features (such as an air bearing surface 108) may be provisioned on a facing surface of the transducer 104 to enable the transducer to be fluidically supported in close proximity to the medium surface 106 by atmospheric currents established during rotation of the medium 102.

The data transducer 104 is shown to include respective read (R), write (W) and light source (L) elements 110, 112 and 114. The read element 110 may take the form of a magneto-resistive (MR) sensor. The write element 112 may include a write coil and one or more magnetically permeable cores. The light source 114 may take the form of a laser diode or other radiation beam source.

During a read operation, the read element 110 operates to sense a magnetization sequence written to the medium 102 along a portion of a selected track. During a write operation, the light source element 114 projects a high powered irradiation "dot" on the rotating medium 102 to locally increase the temperature of the medium, and the write element 112 directs magnetic flux into the heated portions of the medium to write a desired magnetization sequence. The transducer 104 is supported by an actuator arm 116, which, responsive to a servo control system (not shown), radially positions the respective elements 110, 112 and 114 adjacent the disc surface 106 as required.

It will be appreciated that the system represented in FIG. 1 can be readily adapted for a non-HAMR application, in which case the laser element 114 is omitted. It has been found, for example, that formulations of media as disclosed herein are suitable for use in a wide variety of non-HAMR media, such as ECC+CGC perpendicular recording media.

Figure 2:
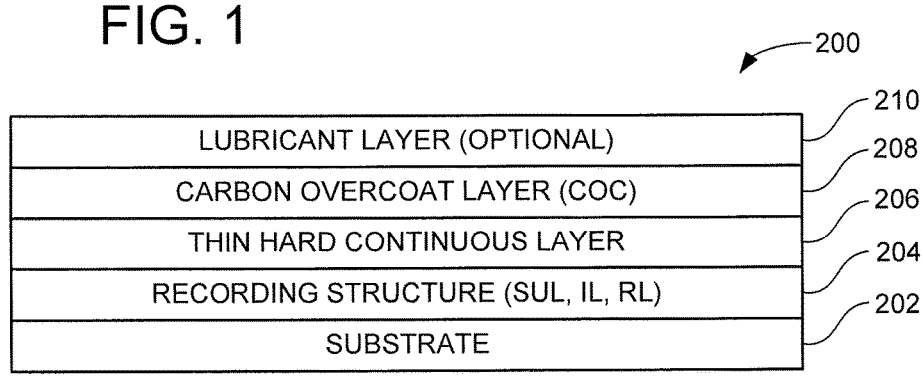
FIG. 2 shows the data storage medium of FIG. 1 in accordance with some embodiments.

FIG. 2 is a schematic depiction of various layers of an exemplary recording medium 200 useful in a data storage system such as described above in FIG. 1. Other media configurations can readily be used. It will be appreciated that FIG. 2 is functional in nature and is not drawn to scale, so that each of the respective layers shown in FIG. 2 may have its own respective thickness.

A base substrate 202 provides mechanical support for the medium 200. A recording structure 204 is formed on the base substrate 202. The recording structure 204 operates to store data from a transducer such as the transducer 104 in FIG. 1. The recording structure 204 may include a number of layers, including a soft magnetic underlayer (SUL) sputtered onto the substrate, one or more interlayers (IL) configured to establish a magnetic easy axis in the perpendicular direction and, and one or more recording layers (RL). The interlayers have high surface roughness to induce grain separation in the subsequently deposited recording layers. Multiple recording layers may be provided with lower layers having relatively higher magnetization, anisotropy and exchange coupling levels and upper layers with softer magnetization and anisotropy. The recording layers will have grain separation sufficient for the intended bit density. Any suitable recording structure configuration can be used as desired.

A thin hard continuous magnetic layer 206 is formed on the recording structure 204. This layer 206, sometimes referred to herein as a stabilization layer and as a single-layer magnetic stabilization structure, in some embodiments may be significantly thinner than the overall thickness of the recording structure 204, such as $1/10^{th}$ the thickness or thinner. In some embodiments, the layer 206 may be on the order of less than 15 angstroms (A) and may have values of magnetic saturation (Ms) greater than about 600 $e\mu/cm^2$ and anisotropic field strengths (Hk) of greater than about 15,000 Oersteds (Oe). The layer 206 generally operates to stabilize the top portion of the recording layers by providing a high level of exchange coupling to the top portion of the recording layers. As desired, a carbon overcoat layer (COC) 208 may be formed on the top magnetic layer 206 for wear and corrosion protection, and a thin layer of lubricant 210 may be applied to the COC layer.

Figure 3:
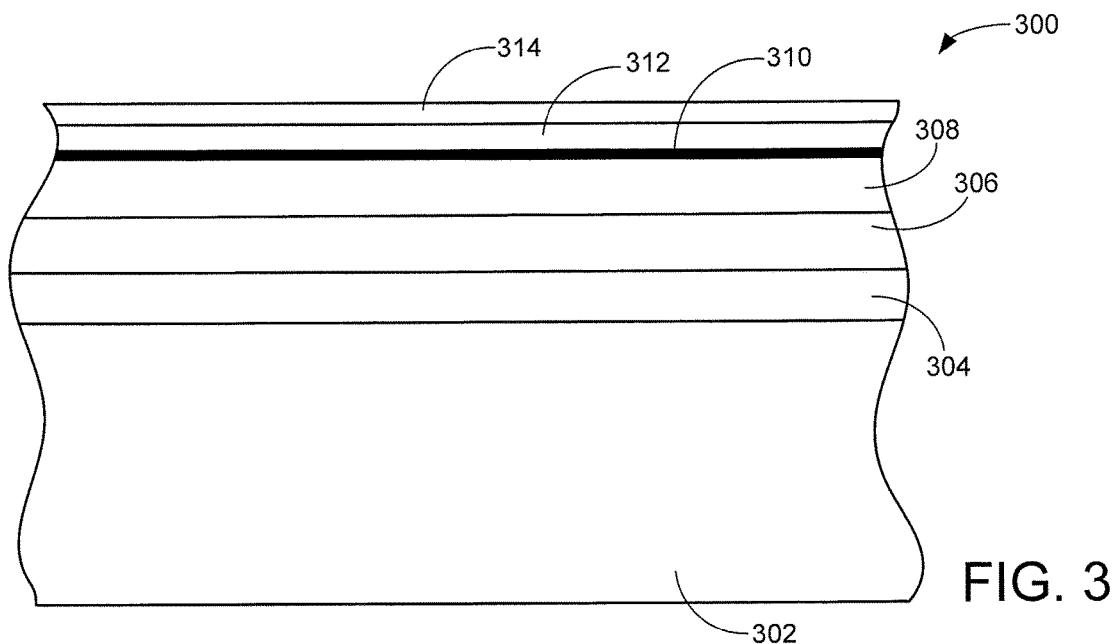
FIG. 3 illustrates the data storage medium of FIG. 1 in accordance with other embodiments.

FIG. 3 shows a cross-section of a recording medium 300 in accordance with other embodiments. The layers are generally representational and are not necessarily drawn to scale. Layers include substrate 302, SUL 304, IL 306, RL 308, stabilization layer 310, COC 312, and lubricant 314. The stabilization layer (e.g., layers 206, 310) can take any suitable form. In some embodiments the stabilization layer is provided with a low Boron (B) content and a relatively high platinum (Pt) content. Such configurations have been found to significantly increase Ms and Hk levels.

With regard to the exemplary structures shown in FIGS. 2 and 3, the substrate can be any substrate that is suitable for magnetic recording media, including Al and glass. The soft magnetic underlayer (SUL) may be sputtered onto the substrate. The interlayer(s) (IL) establish a crystalline orientation base to induce the growth of hcp (0002) in the magnetic layer, with a magnetic easy axis perpendicular to the film plane. The interlayer(s) also establish a high surface roughness to induce grain separation in the subsequently deposited magnetic layers. The magnetic recording layers, as mentioned above, may comprise three or more layers (granular bottom magnetic layers, granular intermediate layer and top continuous magnetic layers) for the best recording performance. The overcoat is carbon layer.

Signal-to-noise ratio (SNR) can be an important parameter for advanced perpendicular recording media. It is generally desirable to have a high signal in a very thin film. Higher signal can be achieved by increasing the saturation magnetization (Ms) of the material at the top of the magnetic layer, and correspondingly increasing the fringing magnetic field that provides signal. Prior art magnetic recording systems generally employ media including a top magnetic layer alloy including Co and Cr, and other elements often include Pt and B to isolate the magnetic grains in the magnetic layer, reduce noise, provide certain anisotropy field (Hk) and anisotropy energy (Ku).

Unfortunately, some of the Cr and B remains in the magnetic grains, reducing Ms to below 500 emu/cc, and correspondingly reducing the signal output of the magnetic layer. Ms can be further degraded by interaction with the protective overcoat. To compensate, thicker magnetic layers are required in order to provide sufficient signal. Addition of Cr and B to the magnetic layer also generally reduces the magnetic anisotropy, Ku, requiring thicker films for thermal stability. Since the Co-alloy layers growth direction is along the {0002} direction in perpendicular media, the media with B addition contains more defects and stacking faults as compared with longitudinal media, which makes it very challenging to grow high Ms and high Hk top magnetic layer.

Figure 4:
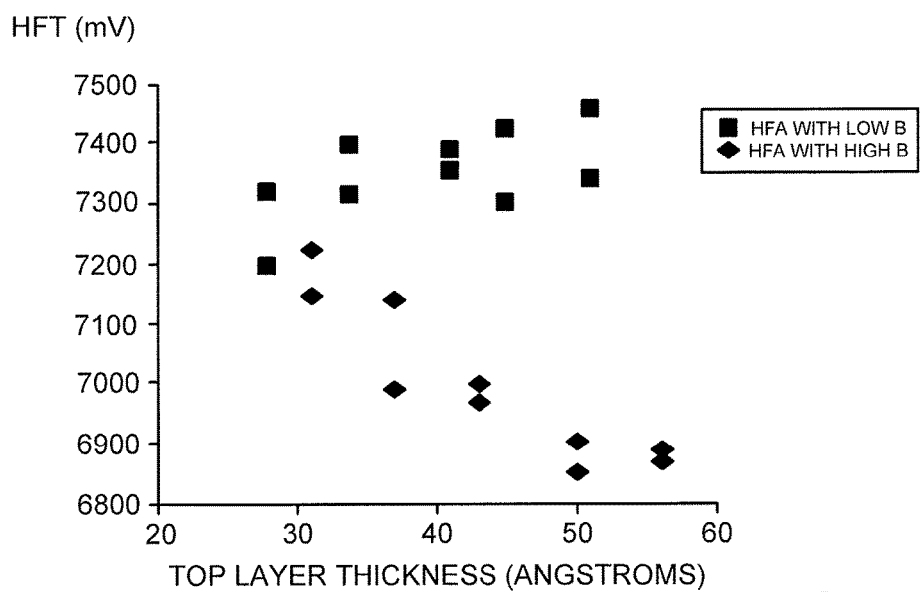
FIG. 4 is a graphical depiction of high frequency amplitude (HFA) response of media with respectively high and low boron (B) content in a top layer.

It has been found by the inventors of the present disclosure that reducing B content in the continuous top magnetic layer can significant increase the high frequency amplitude (HFA) of the record media with the same top magnetic layer thickness. FIG. 4 provides a HFA response plot for different exemplary media with a relatively low B content and a relatively high B content.

As demonstrated by FIG. 4, the HFA increases with the low B content top magnetization thickness where as that of the high content one decreases. This is believed to be related to the difference in the Ms of these two top magnetic layers. Since the Cr and Pt compositions in these two top magnetic layers are the same, the lower B content top magnetic layer has higher Ms. As the top magnetic layer thickness increases, the magnetic moment center of the media moves closer to the head, which reduces the head media-spacing (HMS). The HFA increase with the low B content top mag. thickness is mainly due to the HMS reduction and higher magnetization of the low B content top magnetic layer. The reduction in HMS generally will increase the head field gradient and improves the media signal-to-noise ratio (SNR) and BER.

Another important parameter relating to perpendicular recording media is SFD. Boron has been found to be a good segregation element for recording noise reduction, but it tends to induce defects such as stacking faults, which can increase the intrinsic anisotropy field (Hk) distribution and thus higher SFD. Since the low B top magnetic layer is more exchange coupled and contains fewer defects such as stacking faults, the SFD of the media with low B content top mag. layer has around 0.5 to 1% lower SFD as compared with the media with higher B content top magnetic layer.

Figure 5:
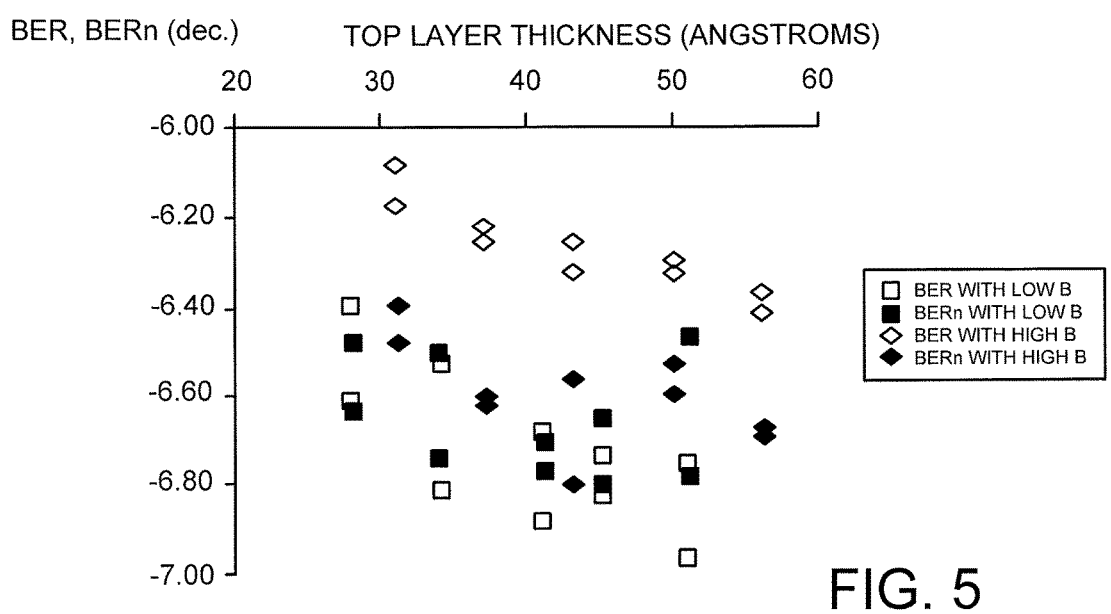
FIG. 5 is a graphical depiction of bit error rate (BER) and normalized bit error rate (BERn) for the media configurations of FIG. 4.

The BER and normalized BER (BERn) responses of two different top magnetic layers with high and low B contents are depicted in FIG. 5. The BER of media with lower B top magnetic layer is shown to be around 0.4 to 0.6 dec better. The write-plus-eraser width (WPE) of the media with lower B top magnetic layer is slightly wider, so normalized BERn for the media with lower B top magnetic layer is 0.2 dec better.

Figure 6:
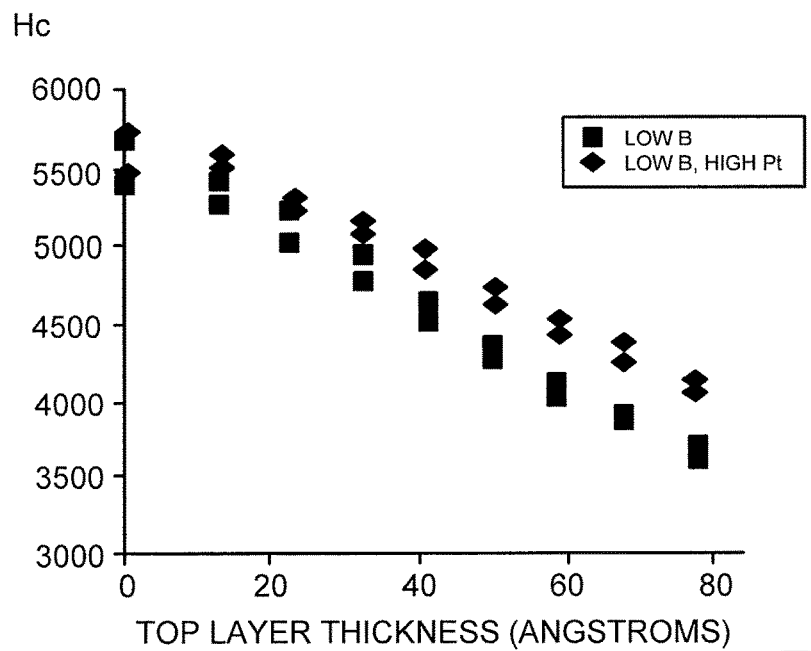
FIG. 6 provides a graphical depiction of magnetic coercivity (Hc) for respective media having a thin top layer with relatively low boron (B) content, and relatively low boron (B) and relatively higher platinum (Pt) contents.
Figure 7:
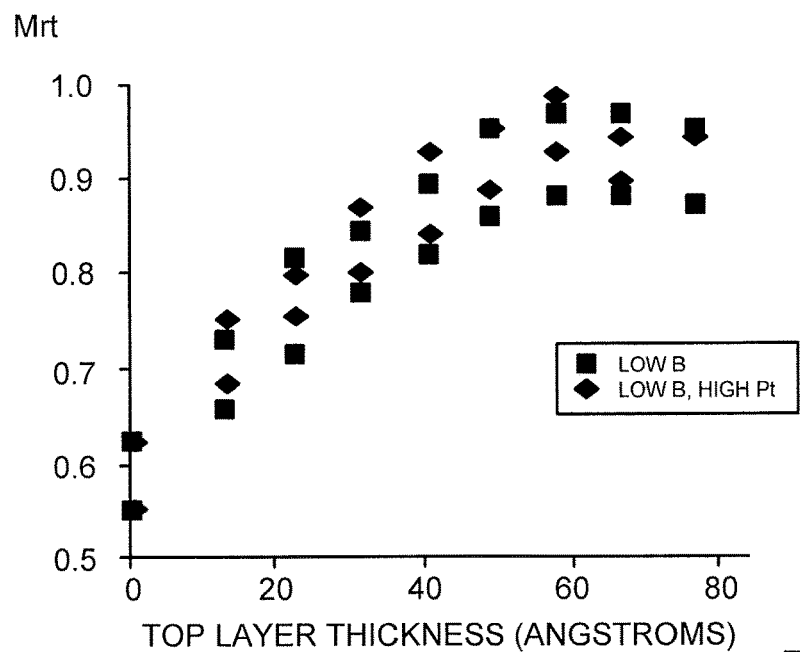
FIG. 7 is a graphical depiction of magnetic resonance topography (Mrt) response for the respective media of FIG. 6.

FIGS. 6 and 7 respectively show Hc (magnetic coercivity) and Mrt (magnetic resonance topography) responses of media with lower B but different Pt contents in the top magnetic layers. Both media have similar Mrt response, indicating the high Ms nature of these two top magnetic layers. The Hc of media with lower B and higher Pt is around 300 to 400 Oe higher in the thickness range of 40 to 60 Å. The Hn of the media with higher Pt top magnetic layer is around 200 to 300 Oe higher for the same thickness range.

The higher Hc and Hn is related to the higher Hk of the lower B and higher Pt top magnetic layer. The top magnetic alloy with lower B content increases Ms significantly; a B content reduction of about 3% can lead to an increase of Ms by about 15% and a decrease in Hk of about 1%.

Figure 8:
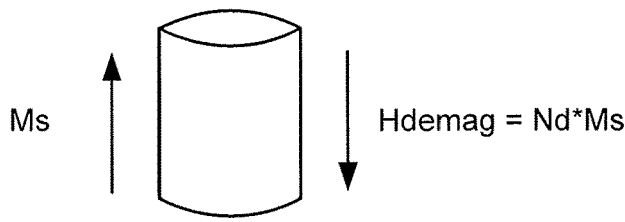
FIG. 8 is a schematic representation of a demagnetization field.

FIG. 8 depicts a schematic representation of a demagnetization field Hdemag. The stability of the written bits is based on the ratio of Nd=Hk/4πMs. The media with the 3% lower B top magnetic layer has around a 17% lower Hk/4πMs ratio, so the side-track erase (STE) performance will be greatly degraded. It follows that, in order to improve the STE performance, a higher Hk and high Ms top magnetic layer is needed.

Figure 9:
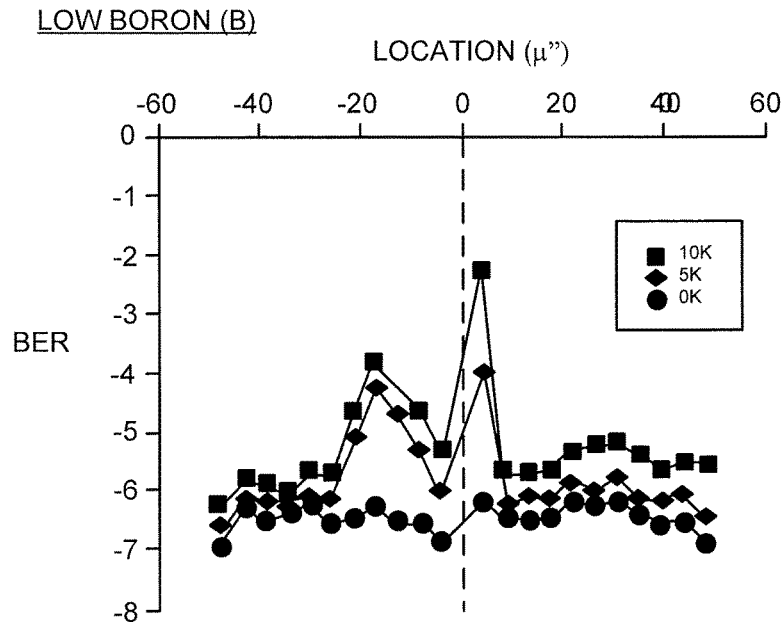
FIG. 9 sets forth a graphical depiction of side-track erase (STE) performance for the media with relatively low boron (B) content.
Figure 10:
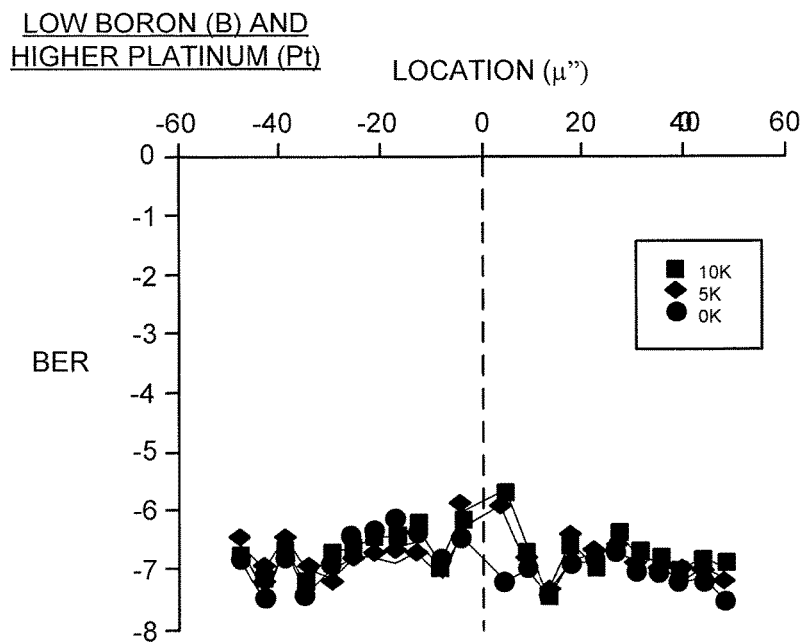
FIG. 10 provides a corresponding graphical depiction of STE performance for the media with relatively low boron (B) and relatively higher platinum (Pt) contents.

FIGS. 9 and 10 show Hc and Mrt response of media with lower B but different Pt contents in the top magnetic layers. FIG. 8 shows response for media with just lower B, and FIG. 9 provides response for both lower B and higher Pt. Both media have similar Mrt response, indicating the high Ms nature of these two top magnetic layers. The Hc of media with lower B and higher Pt is around 300 to 400 Oe higher in the thickness range of 40 to 60 Å for the top magnetic layer (e.g., 310), which is at least 100 times thinner than the underlying recording layer (e.g., 308). The nucleation filed (Hn) of the media with higher Pt top magnetic layer is around 200 to 300 Oe higher for the same thickness range. The higher Hc and Hn is related higher Hk of the lower B and higher Pt top magnetic layer. Table I below provides parametric performance measurements for these respective media configurations.

TABLE I

| Top Mag. | WPE (μ") | Rev_OW (dB) | BER (dec.) | BERn (dec.) | SNRme (dB) |
| --- | --- | --- | --- | --- | --- |
| Low B | 4.3 | −32.4 | −5.7 | −5.9 | 15.4 |
| Low B/High Pt | 4.3 | −31.9 | −6.1 | −6.4 | 15.7 |

The SFD of the media with lower B and higher Pt content top magnetic layer is comparable to that of media with lower B content top magnetic layer. The lower B and higher Pt top magnetic layer with high Ms keeps the advantage of low HMS and SFD, and its higher Hk allows more room for exchange-coupled continuous composite (ECC) media adjustment, so we can further optimize the process and improve media writability (reverse overwrite "Rev_OW"), media signal-to-noise ratio (SNRme) and BER. As shown by Table I, media with the lower B and higher Pt improves SNRme by about 0.3 dB and BER by about 0.4 dec.

The Hk/4πMs ratio of the media with lower B and higher Pt contents can be around 50% higher than that of that of media with lower B top magnetic layer, which should be beneficial to the STE performance of the media. FIG. 9 depicts STE performance of media with lower B content in the top magnetic layer, and FIG. 10 correspondingly shows STE performance of the media with lower B and higher Pt content in the top magnetic layer. It can be seen that the STE performance is significantly better for the media with high Ms & Hk top magnetic layer.

Although the Hk of the top magnetic layer can be improved by increasing the Pt content to an optimum level, a higher than optimum Pt level may actually start to decrease the Hk due to formation of fcc phase and stacking faults in the layer. The defects level and stacking faults density are even higher in the case of media with both higher B and Pt contents. Decreasing B content and increasing Pt content to the optimum in the top magnetic layer at the same time increase Hk with relative high Ms.

With regard to the stabilization layer as embodied herein, it will be appreciated that the so-called continuous layer may not actually be continuous in the traditional sense of an amorphous material with no apparent microstructural features. Here, many of the continuous layers comprise a polycrystalline granular material just like the so called granular layers. One difference is that the grain boundaries of the continuous layer do not have an obvious amorphous (often oxide containing) second phase like the granular layers. Instead, they may be characterized as generally atomically abrupt boundaries, which results in much stronger intergranular exchange coupling for the continuous layers. Commonly, the continuous layers contain CoCrPtB, similar to the prior art longitudinal recording alloys, and such alloys grown in the perpendicular geometry generally have previously desired moderate Hk and Hex values, but significantly lower Hk and higher Hex than the hard granular recording layer of perpendicular media.

Using a higher platinum (Pt) percentage (Pt %) generally increases Hk in a range of Pt %. However, for the longitudinal type continuous alloys with high B % (~10-15%), Hk flattens out above about 10% Pt, limiting the maximum Hk to ~12K. It has been found in the present disclosure that this Hk limit is true for the percentage of boron (B %) down to about 6-8%. As discussed above, it has been found lower B % increases Ms, and also increases Hex, the latter of which is generally found to be bad for the full continuous granular composite (CGC) layer. It also does not increase Hk to counteract the increased demag from high Ms, so the material becomes too easy to erase and too easy to write.

However, as the B % is reduced, it has been found starting at around 6% and increasingly as B % reduces toward 0%, Hk does not roll over until rapidly higher Pt % up to about 20-25% in some cases, and the Hk of the continuous layer can be boosted from about 12 kOe max to 14 kOe, 16 kOe, even close to 20 kOe with very low or no B. Such higher Hk combined with the high Ms is the required combination that gives the unexpected window where a very thin top continuous layer (often less than 2 nm) can be used to increase moment at the top of the media, add some but not too much Hex, and not cause instability and erasure in the stack structure because the demag is too large for the Hk, as is observed in most high Ms continuous alloys that have been tried. This thin top continuous layer may also be just a small part of a thicker continuous layer including a more conventional lower Ms, less exchange coupled, possibly higher B % and Cr % layer.

What is claimed is:

1. A perpendicular data recording medium, comprising:
    a multi-layer recording structure formed on a base substrate and adapted to magnetically store a magnetic bit sequence in domains substantially perpendicular to said layers;
    a single-layer magnetic stabilization structure contactingly disposed on the multi-layer recording structure to magnetically stabilize an upper portion of the multi-layer recording structure, the single-layer magnetic stabilization structure characterized as a single layer of hard magnetic material having a non-zero boron (B) content of less than about 6%, a platinum (Pt) content of about 20-25%, and a thickness of less than 1% of a topmost recording layer of the multi-layer recording structure; and
    a protective overcoat layer contactingly disposed on the single-layer magnetic stabilization structure.

2. The medium of claim 1, in which the single-layer magnetic stabilization structure is a single layer of continuous, hard magnetic material with a thickness of from about 40 to 60 angstroms.

3. The medium of claim 1, in which the single-layer magnetic stabilization structure provides a magnetic saturation level of greater than about 600 eµ/cm$^2$ and anisotropic field strengths (Hk) of greater than about 15,000 Oersteds (Oe).

4. The medium of claim 1, in which the multi-layer recording structure is an ECC+CGC recording structure.

5. The medium of claim 1, in which the multi-layer recording structure comprises a soft underlayer, at least one intermediate layer, and at least one magnetic recording layer, wherein the single-layer magnetic stabilization structure is formed on a topmost one of the at least one magnetic recording layer.

6. The medium of claim 1, in which the single-layer magnetic stabilization structure is a single layer of hard magnetic material having an overall thickness of 10% or less of an overall thickness of the multi-layer recording structure.

7. The medium of claim 1, wherein the protective overcoat is a carbon overcoat layer contactingly disposed on the single-layer magnetic stabilization structure.

8. A perpendicular data recording medium, comprising:
    a multi-layer recording structure adapted to magnetically store a magnetic bit sequence in domains substantially perpendicular to said layers;
    a thin hard magnetic layer contactingly disposed on the multi-layer recording structure to magnetically stabilize an upper portion of the recording structure, the thin hard magnetic layer formed of only a single layer of hard magnetic material and having an overall thickness of 10% or less of an overall thickness of the multi-layer recording structure, the single layer of hard magnetic material further having a thickness of less than 1% of a topmost recording layer of the recording structure; and
    a protective overcoat layer contactingly disposed on the thin hard magnetic layer.

9. The medium of claim 8, in which the thin hard magnetic layer comprises a non-zero boron (B) content of less than about 6%.

10. The medium of claim 9, in which the thin hard magnetic layer further comprises a platinum (Pt) content of about 20-25%.

11. The medium of claim 8, in which the thin hard magnetic layer provides a magnetic saturation level of greater than about 600 eµ/cm$^2$ and anisotropic field strengths (Hk) of greater than about 15,000 Oersteds (Oe) for the medium.

12. The medium of claim 8, in which the multi-layer recording structure is an ECC+CGC recording structure.

13. The medium of claim 8, in which the multi-layer recording structure comprises a soft underlayer, at least one intermediate layer, and at least one magnetic recording layer, wherein the thin hard magnetic layer is contactingly disposed on a topmost one of the at least one magnetic recording layer.

14. The medium of claim 8, wherein the protective overcoat layer is a carbon overcoat layer formed on the thin hard magnetic layer and the medium further comprises a layer of lubricant contactingly disposed on the carbon overcoat layer.

15. A perpendicular data recording medium, comprising:
    a multi-layer recording structure adapted to magnetically store a magnetic bit sequence in domains substantially perpendicular to said layers, the multi-layer recording structure comprising a topmost magnetic recording layer;
    a single-layer magnetic stabilization structure contactingly disposed on the topmost magnetic recording layer of the multi-layer recording structure, the single-layer magnetic stabilization structure comprising only a single layer of hard magnetic material, the single layer of hard magnetic material having a non-zero boron (B) content of less than about 6, a platinum (Pt) content of about 20-25%, and a thickness of less than 1% of a topmost recording layer of the multi-layer recording structure, the single layer of hard magnetic material providing a magnetic saturation level of greater than about 600 eµ/cm$^2$ and anisotropic field strengths (Hk) of greater than about 15,000 Oersteds (Oe) for the medium; and
    a carbon overcoat protective layer contactingly disposed on the single-layer magnetic stabilization structure.

16. The medium of claim 15, in which the single-layer magnetic stabilization structure has an overall thickness of about 10% or less than an overall thickness of the multi-layer recording structure.

\* \* \* \* \*

UNITED STATES PATENT AND TRADEMARK OFFICE
CERTIFICATE OF CORRECTION

PATENT NO. : 10,002,632 B2
APPLICATION NO. : 13/722632
DATED : June 19, 2018
INVENTOR(S) : Bo Bian et al.

Page 1 of 1

It is certified that error appears in the above-identified patent and that said Letters Patent is hereby corrected as shown below:

In the Claims

In Column 8, Line 51:
"about 6," should be "about 6%,"

Signed and Sealed this
Twenty-fifth Day of December, 2018

Andrei Iancu
*Director of the United States Patent and Trademark Office*